(12) United States Patent
Teichmann et al.

(10) Patent No.: US 10,804,547 B2
(45) Date of Patent: Oct. 13, 2020

(54) POWER GENERATION SYSTEM AND A METHOD FOR OPERATING THE SAME

(71) Applicant: CUMMINS ENTERPRISE LLC, Indianapolis, IN (US)

(72) Inventors: Ralph Teichmann, Niskayuna, NY (US); Honggang Wang, Clifton Park, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 179 days.

(21) Appl. No.: 15/866,494

(22) Filed: Jan. 10, 2018

(65) Prior Publication Data
US 2019/0214661 A1    Jul. 11, 2019

(51) Int. Cl.
*H01M 8/04007*    (2016.01)
*H01M 8/04119*    (2016.01)
(Continued)

(52) U.S. Cl.
CPC ........... *H01M 8/04059* (2013.01); *C01B 3/02* (2013.01); *H01M 8/04007* (2013.01);
(Continued)

(58) Field of Classification Search
CPC ......... H01M 8/04059; H01M 8/04007; H01M 8/0618; H01M 8/04164; H01M 8/04268;
(Continued)

(56) References Cited

U.S. PATENT DOCUMENTS 6,798,083 B2    9/2004 Mueller
7,481,072 B2    1/2009 Ostrom et al.
(Continued)

OTHER PUBLICATIONS

Y. Berrouche et al., "Application of an electroosmotic (EO) pump in power electronics cooling and in the direct methanol fuel cell (DMFC) of a portable system", Industrial Electronics, 2008. ISIE 2008. IEEE International Symposium on, pp. 1574-1579, 2008, Cambridge.
(Continued)

*Primary Examiner* — Ula C Ruddock
*Assistant Examiner* — Matthew W Van Oudenaren
(74) *Attorney, Agent, or Firm* — Barnes & Thornburg LLP

(57) ABSTRACT

The power generation system includes a fuel-cell subsystem having a fuel-cell configured to generate an electrical power. The power generation system further includes a power electronics subsystem electrically coupled to the fuel-cell subsystem and configured to process at least a portion of the electrical power generated by the fuel-cell subsystem. The power generation system also includes a first conduit fluidly coupled to the power electronics subsystem and configured to supply at least a portion of a fuel stream to the power electronics subsystem. The power electronics subsystem is configured to heat the portion of the fuel stream to form a pre-heated fuel stream. Moreover, power generation system includes a second conduit fluidly coupled to the power electronics subsystem and the fuel-cell subsystem and configured to supply the pre-heated fuel stream to the fuel-cell subsystem. The fuel-cell is configured to generate the electrical power using the pre-heated fuel stream.

12 Claims, 8 Drawing Sheets

(51) Int. Cl.
*H01M 8/04223* (2016.01)
*H01M 8/0438* (2016.01)
*H01M 8/0612* (2016.01)
*C01B 3/02* (2006.01)
*F28D 21/00* (2006.01)
*H01M 8/124* (2016.01)

(52) U.S. Cl.
CPC ..... *H01M 8/0438* (2013.01); *H01M 8/04164* (2013.01); *H01M 8/04268* (2013.01); *H01M 8/0618* (2013.01); *F28D 2021/0043* (2013.01); *H01M 8/04037* (2013.01); *H01M 8/04067* (2013.01); *H01M 2008/1293* (2013.01)

(58) Field of Classification Search
CPC ........... H01M 8/0438; H01M 8/04067; H01M 8/04037; H01M 8/04925; H01M 8/04029; H01M 8/04089; H01M 8/04201; H01M 2008/1293
See application file for complete search history.

(56) References Cited

U.S. PATENT DOCUMENTS

| | | | |
|---|---|---|---|
| 8,159,823 | B2 | 4/2012 | Murakami |
| 8,822,093 | B2 | 9/2014 | Kim et al. |
| 2001/0016274 | A1* | 8/2001 | Kawasumi ............. B01B 1/005 429/423 |
| 2001/0049906 | A1* | 12/2001 | Shimazu ................ B01B 1/005 48/76 |
| 2005/0014040 | A1* | 1/2005 | Kaye ..................... B01J 8/0214 429/424 |
| 2006/0194087 | A1 | 8/2006 | Park et al. |
| 2007/0148509 | A1 | 6/2007 | Colbow et al. |
| 2007/0248861 | A1 | 10/2007 | Hoshi |

OTHER PUBLICATIONS

Heesung Park, "Numerical assessment of liquid cooling system for power electronics in fuel cell electric vehicles", International Journal of Heat and Mass Transfer, vol. 73, pp. 511-520, Jun. 2014.

* cited by examiner

POWER GENERATION SYSTEM AND A METHOD FOR OPERATING THE SAME

BACKGROUND

Embodiments of the present specification relate to a power generation system and, more particularly to a fuel-cell-based power generation system and a method for operating such a power generation system.

A fuel-cell is an electrochemical energy conversion device that has demonstrated a potential in terms of higher efficiency and lower pollution in comparison to that of coal and/or diesel based power generation systems. Common types of fuel-cells include a polymer electrolyte membrane fuel-cell, a direct methanol fuel-cell, an alkaline fuel-cell, a phosphoric acid fuel-cell, a molten carbonate fuel-cell, or a solid oxide fuel-cell (SOFC). Fuel-cells, such as SOFCs, may operate in large-scale power generation systems to satisfy industrial and municipal needs.

Typically, in a power generation system employing the fuel-cell, the fuel-cell generates a direct current (DC) electrical power. The generated DC electrical power may be converted to an alternating current (AC) electrical power using a power converter, for example, an inverter. During operation of such power generation systems, the inverter generates heat. Therefore, the power generation systems include subsystems for facilitating cooling of the heated inverter. Some power generation systems include dedicated liquid or air cooling subsystems to dissipate the heat generated by the inverter. By way of example, the dedicated liquid or air cooling subsystems require additional components including, but not limited to, one or more fans, a network of pipelines for facilitating a circulation of a coolant, and one or more pumps to effect the circulation of the coolant through the network of pipelines. Consequently, such dedicated cooling subsystems may increase the overall size, cost, and complexity of the power generation system.

BRIEF DESCRIPTION

In accordance with one embodiment of the present specification, a power generation system is presented. The power generation system includes a fuel-cell subsystem having a fuel-cell configured to generate an electrical power. The power generation system further includes a power electronics subsystem electrically coupled to the fuel-cell subsystem and configured to process at least a portion of the electrical power generated by the fuel-cell subsystem. Furthermore, the power generation system includes a first conduit fluidly coupled to the power electronics subsystem and configured to supply at least a portion of a fuel stream to the power electronics subsystem, where the power electronics subsystem is configured to heat the portion of the fuel stream to form a pre-heated fuel stream. Moreover, power generation system includes a second conduit fluidly coupled to the power electronics subsystem and the fuel-cell subsystem and configured to supply the pre-heated fuel stream to the fuel-cell subsystem. The fuel-cell is configured to generate the electrical power using the pre-heated fuel stream.

In accordance with another embodiment of the present specification, a power generation system is presented. The power generation system includes a fuel-cell subsystem having a solid oxide fuel-cell (SOFC) configured to generate a direct current (DC) electrical power. The power generation system further includes an inverter electrically coupled to the fuel-cell subsystem and configured to convert the DC electrical power generated by the SOFC to an alternating current (AC) electrical power. Furthermore, the power generation system includes a first conduit fluidly coupled to the inverter and configured to supply at least a portion of a fuel stream to the inverter, where the inverter is configured to heat the portion of the fuel stream to form a pre-heated fuel stream. Moreover, power generation system includes a second conduit fluidly coupled to the inverter and the fuel-cell subsystem and configured to supply the pre-heated fuel stream to the fuel-cell subsystem. The SOFC is configured to generate the DC electrical power using the pre-heated fuel stream.

In accordance with yet another embodiment of the present specification, a method for operating a power generation system is presented. The power generation system includes a fuel-cell subsystem having a fuel-cell configured to generate an electrical power and a power electronics subsystem electrically coupled to the fuel-cell subsystem. The method includes receiving, by the power electronics subsystem, at least a portion of a fuel stream. The method further includes heating, by the power electronics subsystem, at least the portion of a fuel stream to form a pre-heated fuel stream. Furthermore, the method includes supplying, by the power electronics subsystem, the pre-heated fuel stream to the fuel-cell subsystem. The method also includes generating, by the fuel-cell, the electrical power using the pre-heated fuel stream. Moreover, the method includes processing, by the power electronics subsystem, at least a portion of the electrical power generated by the fuel-cell subsystem.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be noted that the term "fluid" as used herein includes any medium or material that flows, including, but not limited to, gas, liquid, or a combination thereof. Further, the terms "fluidly coupled" or "fluidly coupling", as used herein, refer to an arrangement or a connection between two components that facilitates flow of fluid from one component to another component, or vice-versa.

Figure 1:
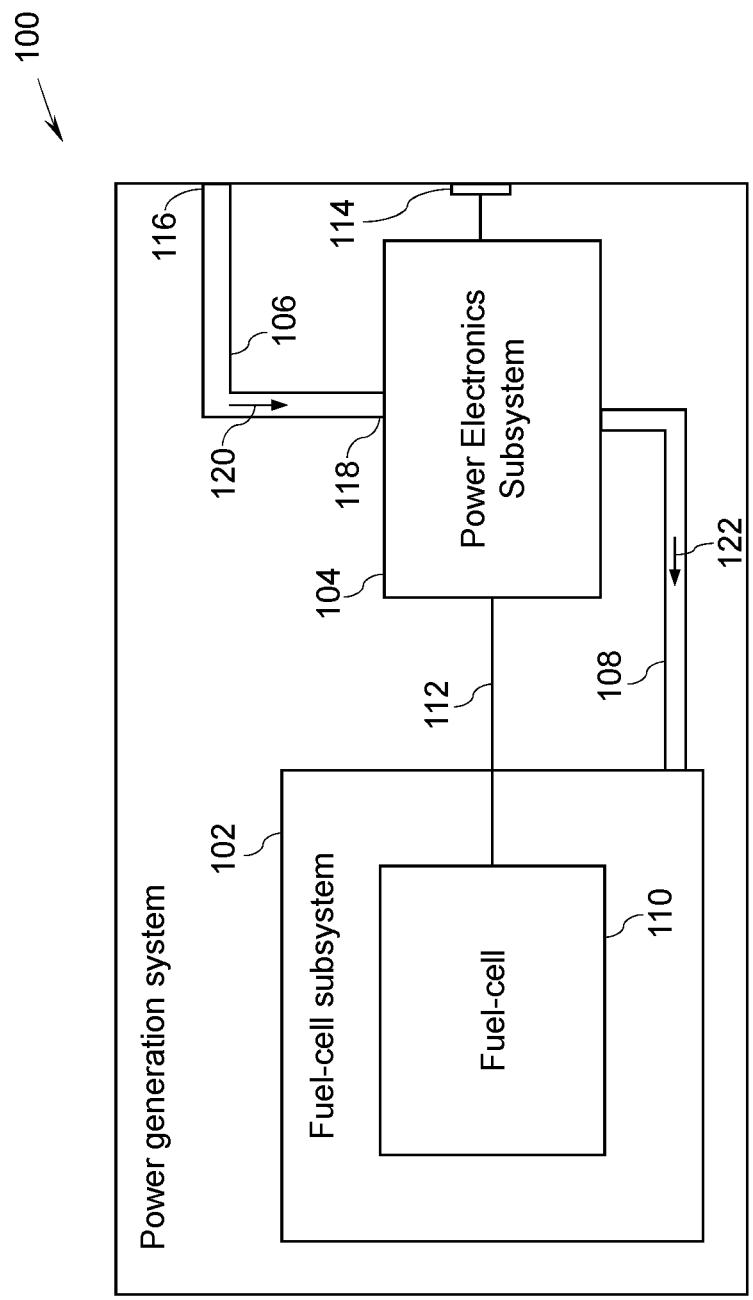
FIG. 1 is a block diagram of a power generation system, in accordance with one embodiment of the present specification.

FIG. 1 is a block diagram of a power generation system 100, in accordance with one embodiment of the present specification. The power generation system 100 may include a fuel-cell subsystem 102, a power electronics subsystem 104, a first conduit 106, and a second conduit 108. The fuel-cell subsystem 102 includes a fuel-cell 110 configured to generate an electrical power. The power electronics subsystem 104 is electrically coupled to the fuel-cell subsystem 102 and configured to process at least a portion of the electrical power generated by the fuel-cell subsystem 102. The first conduit 106 is fluidly coupled to the power electronics subsystem 104 to supply at least a portion 120 of a fuel stream to the power electronics subsystem 104, where the power electronics subsystem 104 is configured to heat the portion 120 of the fuel stream to form a pre-heated fuel stream 122. The second conduit 108 is fluidly coupled to the power electronics subsystem 104 and the fuel-cell subsystem 102 to supply the pre-heated fuel stream 122 to the fuel-cell subsystem 102. The fuel-cell 110 receives the pre-heated fuel stream 122 from the power electronics subsystem 104 via the second conduit 108 and is configured to generate the electrical power using the pre-heated fuel stream 122.

In some embodiments, the fuel stream may include a hydrocarbon gas. In a non-limiting example, the hydrocarbon gas includes a natural gas. Other fuels including, but not limited to, any gas or liquid may also be used in the fuel stream, without limiting the scope of the present specification. Non-limiting examples of other fuels may include methane, ethane, propane, biogas, syngas, diesel, kerosene, gasoline, jet fuel such as Jet Propellant-8 (JP-8), or combinations thereof.

The fuel-cell 110 may generate the electrical power based on a chemical reaction between hydrogen and oxygen, in some embodiments. In some other embodiments, the fuel-cell 110 may generate the electrical power based on a chemical reaction between hydrogen, oxygen, and carbon monoxide (CO). The hydrogen may be obtained from the pre-heated fuel stream 122 and water vapor/steam received by the fuel-cell 110. To facilitate the generation of the hydrogen, in some embodiments, the fuel-cell 110 may include a reformer (not shown) that facilitates a chemical reaction between the pre-heated fuel stream 122 and the steam. In some embodiments, when the fuel-cell 110 is a solid-oxide fuel-cell (SOFC), a separate reformer may not be required. Also, the fuel-cell 110 typically includes an anode (not shown), a cathode (not shown), and an electrolyte (not shown) disposed between the anode and the cathode. In some embodiments, the hydrogen may be provided at the anode and the oxygen may be provided at the cathode. The anode facilitates oxidation reactions to generate positively charged hydrogen ions and electrons from the hydrogen supplied at the anode. The positively charged hydrogen ions may travel from the anode to the cathode via the electrolyte. At the same time, the electrons may travel from the anode to cathode via a separate electrical path. Such a flow of the electrons constitutes a direct current (DC) electrical power. Moreover, the positively charged hydrogen ions may be chemically reacted with the oxygen at the cathode which results in formation of water as an exhaust from the fuel-cell 110. Non-limiting examples of the fuel-cell 110 may include a polymer electrolyte membrane fuel-cell, a direct methanol fuel-cell, an alkaline fuel-cell, a phosphoric acid fuel-cell, a molten carbonate fuel-cell, an SOFC, or a reversible fuel-cell.

The DC electrical power generated by the fuel-cell 110 of the fuel-cell subsystem 102 may be provided to the power electronics subsystem 104 via an electrical link 112. By way of example, the electrical link 112 may be a DC-link which typically includes two conductors or terminals—one maintained at a positive potential and another maintained at a negative potential. Other types of electrical links employing more than two conductors/terminals may also be used without limiting the scope of the present specification.

Figure 3:
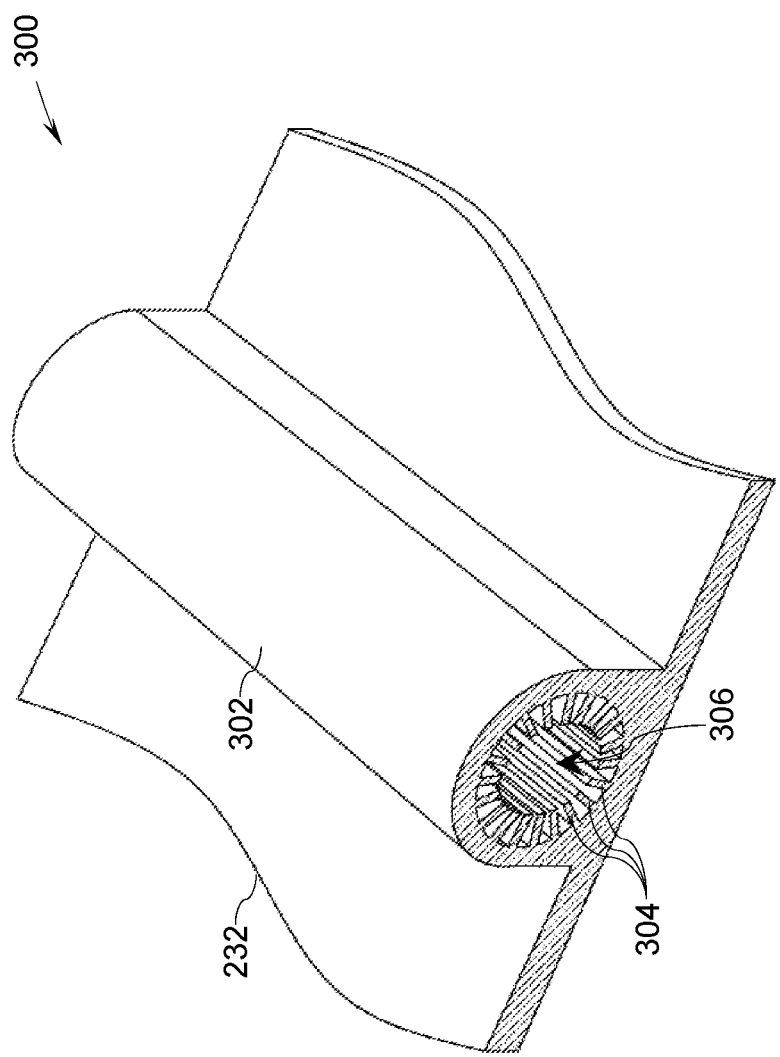
FIG. 3 is a perspective view of a portion of a thermally conductive medium used in the power generation systems of FIGS. 1 and 2, in accordance with one embodiment of the present specification.
Figure 4:
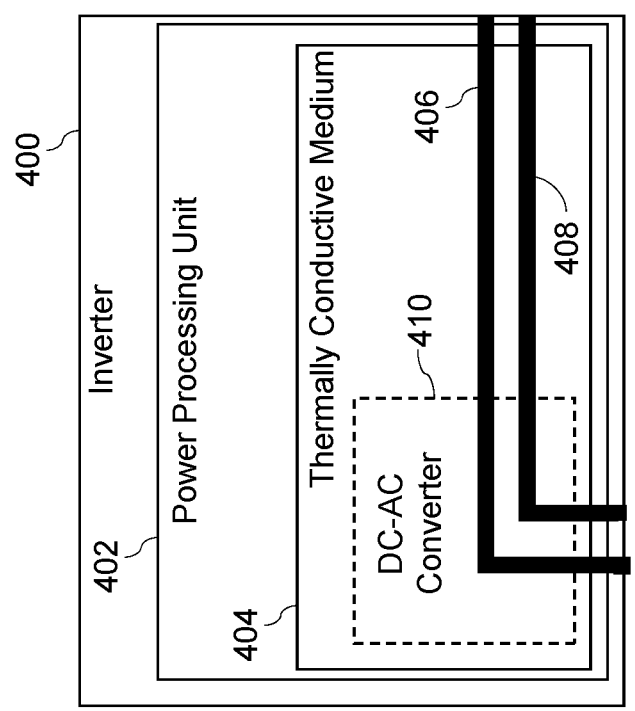
FIG. 4 is a block diagram of an inverter for use as a power electronics subsystem in the power generation systems of FIGS. 1 and 2, in accordance with one embodiment of the present specification.

In some embodiments, the power electronics subsystem 104 may be implemented as a power converter such as an inverter (see FIG. 4). In such a configuration, power electronics subsystem 104 may be configured to convert the DC electrical power received from the fuel-cell subsystem 102 to an alternating current (AC) electrical power. This AC electrical power may be supplied to an external load (not shown) via an output power port 114. The output power port 114 may be representative of an arrangement (e.g., a power socket) to provide an access the AC electrical power generated by the power generation system 100. The external load may be connected to the power generation system 100 via the output power port 114. In some embodiments, the power electronics subsystem 104 may include power processing units for providing electrical power to auxiliary units, for example, fans, heat exchangers, and the like, of the power generation system 100. In some embodiments, the power electronics subsystem 104 may include both the inverter and power processing units for providing electrical power to the auxiliary units. Additional details of the power electronics subsystem 104 will be described in conjunction with FIGS. 2 and 3.

The first conduit 106 and the second conduit 108 may represent any suitable mediums such as pipes, flexible or rigid, to allow passage of the portion 120 of the fuel stream therethrough. As depicted in FIG. 1, the first conduit 106 may facilitate a flow of the portion 120 of the fuel stream from outside the power generation system 100 to the power electronics subsystem 104. By way of example, an end 116 of the first conduit 106 may be fluidly coupled to a pipeline (not shown) or a storage unit/reservoir (not shown) of the fuel to receive the portion 120 of the fuel stream. The other end 118 of the first conduit 106 may be fluidly coupled to the power electronics subsystem 104 to supply at least the portion 120 of the fuel stream to the power electronics subsystem 104. The received at least the portion 120 of the fuel stream passes though the power electronics subsystem 104.

During operation of the power generation system 100, while processing the electrical power received from the fuel-cell subsystem 102, the power electronics subsystem 104 may generate heat. In accordance with some embodiments, such heat generated by the power electronics subsystem 104 is transferred to the portion 120 of the fuel stream passing though the power electronics subsystem 104, thereby heating the portion 120 of the fuel stream to generate the pre-heated fuel stream 122. This pre-heated fuel stream 122 is supplied to the fuel-cell subsystem 102 via the second conduit 108.

Table-1 represents a non-limiting example of an amount of heat removal using a fuel stream in a 1 megawatt (MW) power generation system that is operated at different loads and supplied with a fuel such as a natural gas (NG) via the first conduit 106 at various flow rate and temperatures.

TABLE 1

Heat removal example using the natural gas as a fuel stream

| Parameters | Unit | Case 1 | Case 2 | Case 3 | Case 4 | Case 5 | Case 6 |
|---|---|---|---|---|---|---|---|
| Load | % | 100% | 100% | 130% | 130% | 80% | 80% |
| $Cp_{NG}$ | kJ/kg/C. | 2.2 | 2.2 | 2.2 | 2.2 | 2.2 | 2.2 |
| NG mass flow rate ($m_{NG}$) | kg/second | 0.036 | 0.036 | 0.047 | 0.047 | 0.029 | 0.029 |
| $T_{in-NG}$ | ° C. | 0 | 30 | 0 | 30 | 0 | 30 |
| $T_{out-NG}$ | ° C. | 70 | 70 | 70 | 70 | 70 | 70 |
| Heat removal by NG ($Q_{NG}$) | kW | 5.5 | 3.2 | 7.2 | 4.1 | 4.4 | 2.5 |

In Table-1, $T_{in-NG}$ represents the temperature of the NG prior to reaching the power electronics subsystem 104 (e.g., in the first conduit 106), $T_{out-NG}$ represents the temperature of the NG after exiting from the power electronics subsystem 104 (e.g., in the second conduit 108), and $Cp_{NG}$ represents heat capacity of the NG. Moreover, the abbreviations kJ and kg are respectively used to refer to kilojoules and kilograms. By way of example, $T_{in-NG}=0°$ C. and $T_{in-NG}=30°$ C. represents the typical temperatures for the NG in the winter and summer, respectively. In some embodiments, the heat removal value ($Q_{NG}$) may be determined using following equation:

$$Q_{NG}=m_{NG}*Cp_{NG}*(T_{out-NG}-T_{in-NG}) \quad \text{(Equation 1)}$$

In a non-limiting example of case 3 where the power generation system 100 is operated at 130% load (i.e., 30% more than a rated load), if $T_{in-NG}=0°$ C., $T_{out-NG}=70°$ C., and the NG mass flow rate $m_{NG}=0.047$ kilogram/second, 7.5 kW of heat may be recovered due to the heat transferred by the power electronics subsystem 104 to the NG flowing therethrough. It may also be observed from Table-1 that as the temperature $T_{in-NG}$ of the NG prior to reaching the power electronics subsystem 104 increases, for example $T_{in-NG}=30°$ C., the amount of the heat removed ($Q_{NG}$) decreases (see cases 2, 4, and 6). Also, for given values of $T_{in-NG}$, $T_{out-NG}$, and $m_{NG}$, the load of the power generation system 100 affects the amount of the heat recovered/removed ($Q_{NG}$).

In accordance with some embodiments, the configuration of the power generation system 100 advantageously utilizes the heat generated by the power electronics subsystem 104, which, otherwise, would have been dissipated in the surroundings of the power electronics subsystem 104, to pre-heat the portion 120 of the fuel stream. This pre-heating of the portion 120 of the fuel stream prior to being supplied to the fuel-cell subsystem 102 requires reduced heating of the pre-heated fuel stream 122 within the fuel-cell subsystem 102. Accordingly, the size, cost, and complexity of the fuel-cell subsystem 102 may be reduced in comparison to traditional fuel-cell subsystems. Additionally, the transfer of the heat from the power electronics subsystem 104 to the portion 120 of the fuel stream passing though the power electronics subsystem 104 aids in cooling the power electronics subsystem 104. This cooling of the power electronics subsystem 104 effected by the transfer of the heat to the portion 120 of the fuel stream obviates or minimizes need for additional cooling subsystems thereby reducing the overall size, cost, and complexity of the power generation system 100.

Figure 2:
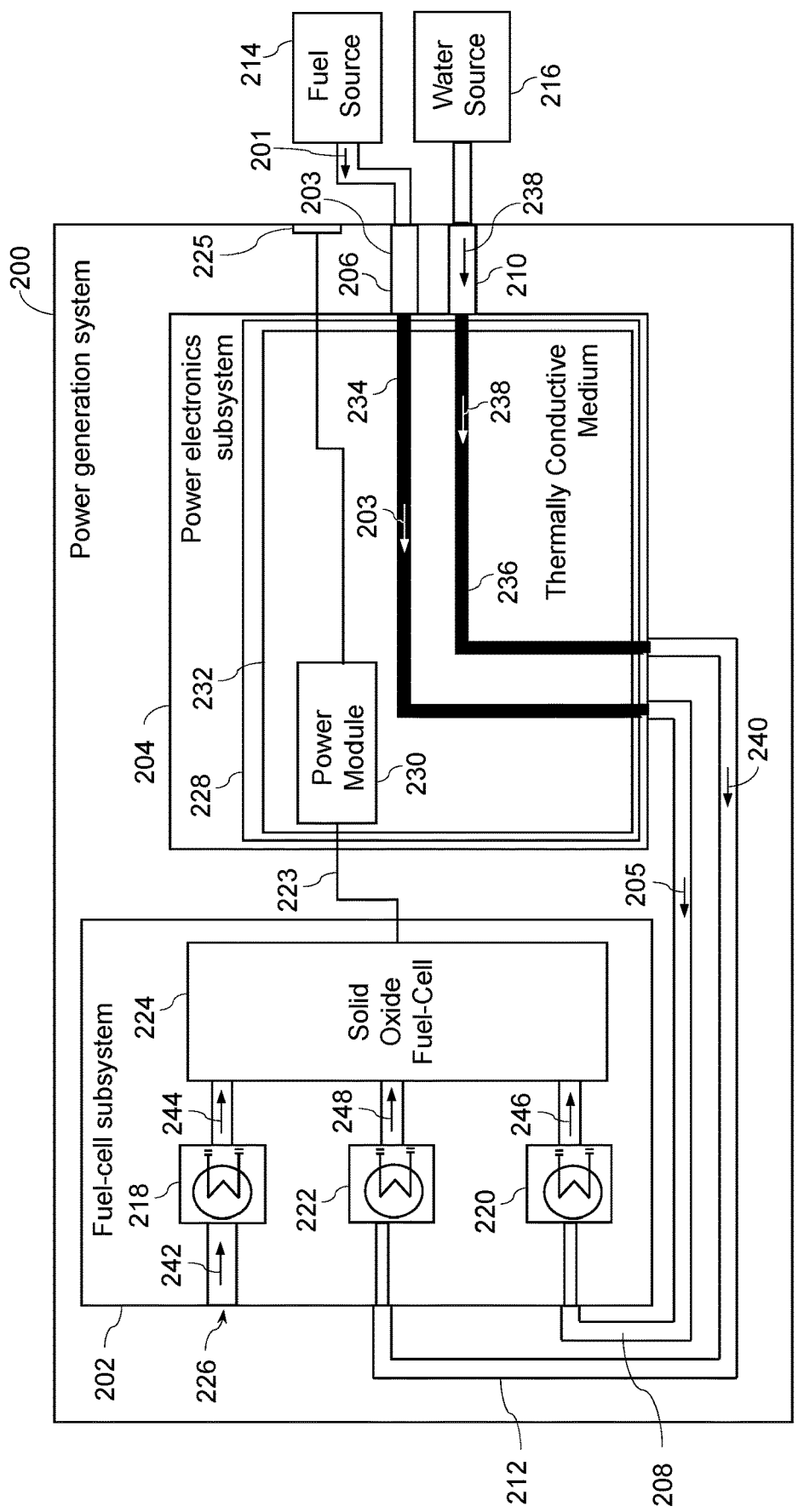
FIG. 2 is a block diagram of a power generation system, in accordance with another embodiment of the present specification.

FIG. 2 is a block diagram of a power generation system 200, in accordance with another embodiment of the present specification. In some embodiments, the power generation system 200 may include a fuel-cell subsystem 202 and a power electronics subsystem 204. The power generation system 200 may also include a plurality of conduits such as a first conduit 206, a second conduit 208, a third conduit 210, and/or a fourth conduit 212. Further, the power generation system 200 may be coupled to a fuel source 214 and a water source 216. The fuel source 214 and/or the water source 216 may be representative of tanks, containers, or pipelines containing fuel and water, respectively.

In some embodiments, the first conduit 206 may be fluidly coupled to the power electronics subsystem 204 to supply at least a portion 203 of a fuel stream 201 from the fuel source 214 to the power electronics subsystem 204, where the power electronics subsystem 204 is configured to heat the portion 203 of the fuel stream 201 to form a pre-heated fuel stream 205. The second conduit 208 is fluidly coupled to the power electronics subsystem 204 and the fuel-cell subsystem 202 to supply the pre-heated fuel stream 205 to the fuel-cell subsystem 202. In some embodiments, the fuel stream 201 may include hydrocarbon gas. In one non-limiting example, the hydrocarbon gas may include a natural gas. Other non-limiting examples of the fuel stream 201 may include methane, ethane, propane, biogas, syngas, diesel, kerosene, gasoline, jet fuel such as JP-8, or combinations thereof.

Moreover, in some embodiments, the third conduit 210 is fluidly coupled to the water source 216 and the power electronics subsystem 204 to supply at least a portion of a water stream 238 from the water source 216 to the power electronics subsystem 204, where the power electronics subsystem 204 is configured to heat the water stream 238 to form a pre-heated water stream 240. Additionally, the fourth conduit 212 is fluidly coupled to the power electronics subsystem 204 and the fuel-cell subsystem 202 to supply the pre-heated water stream 240 to the fuel-cell subsystem 202.

The fuel-cell subsystem 202 may be representative of one embodiment of the fuel-cell subsystem 102 of FIG. 1. The fuel-cell subsystem 202 may include a plurality of heat exchangers, such as a first heat exchanger 218, a second heat exchanger 220, and a third heat exchanger 222. The first heat exchanger 218, the second heat exchanger 220, and the third heat exchanger 222 are hereinafter collectively referred to as heat exchangers 218-222. The fuel-cell subsystem 202 may also include an SOFC 224 coupled to the heat exchangers 218-222. The SOFC 224 is configured to generate a DC electrical power using at least the pre-heated fuel stream 205. The heat exchangers 218-222 may include one or more heating elements configured to heat the fluid passing therethrough.

The first heat exchanger 218 may be configured to receive a heat transfer fluid 242 via an inlet 226. In some embodiments, the heat transfer fluid 242 may be air, for example, ambient air. Further, the first heat exchanger 218 is configured to heat the received heat transfer fluid 242 to generate a heated heat transfer fluid 244 and supply the heated heat transfer fluid 244 to the SOFC 224. The second heat exchanger 220 may be configured to receive the pre-heated fuel stream 205 from the power electronics subsystem 204 via the second conduit 208 and heat the received pre-heated fuel stream 205 to generate a heated fuel stream 246. Moreover, the second heat exchanger 220 may be configured to supply the heated fuel stream 246 to the SOFC 224.

In some embodiments, water may also be supplied to the fuel-cell subsystem 202. In some embodiments, a pre-heated water stream 240 may be supplied to the fuel-cell subsystem 202 via the fourth conduit 212. The third heat exchanger 222 may be configured to receive the pre-heated water stream 240 from the fourth conduit 212. Further, the third heat exchanger 222 may be configured to heat the received pre-heated water stream 240 to generate steam 248 and supply the steam 248 to the SOFC 224. In some embodiments, the third heat exchanger 222 and the second heat exchanger 220 may be combined as one heat exchanger by receiving the mixture of pre-heated fuel stream 205 and steam.

Typically, the SOFC 224 includes an anode (not shown), a cathode (not shown), and an electrolyte (not shown). In comparison to other types of fuel-cells, the SOFC 224 uses a ceramic compound as the electrolyte. The SOFC 224 may receive the heated heat transfer fluid 244, the heated fuel stream 246, and the steam 248 from the first heat exchanger 218, the second heat exchanger 220, and the third heat exchanger 222, respectively. The SOFC 224 may be configured to generate hydrogen from the heated fuel stream 246 and generate a DC electrical power using at least the hydrogen thus generated. The generated DC electrical power may be supplied to the power electronics subsystem 204.

The power electronics subsystem 204 is electrically coupled to the fuel-cell subsystem 202 via an electrical link 223. The electrical link 223 may be similar to the electrical link 112 of FIG. 1. The power electronics subsystem 204 may be representative of one embodiment of the power electronics subsystem 104 of FIG. 1 and configured to process at least a portion of the electrical power generated by the fuel-cell subsystem 202. In some embodiments, the power electronics subsystem 204 may be implemented as an inverter (see FIG. 4). In such a configuration of the power electronics subsystem 204, a processed electrical power (i.e., output electrical power) may be provided to an output power port 225 of the power generation system 200. The output power port 225 of the power generation system 200 may be similar to the output power port 114 the power generation system 100 of FIG. 1. In some embodiments, the power electronics subsystem 204 may be implemented as an auxiliary power electronics circuit. In such a configuration of the power electronics subsystem 204, the processed electrical power generated by the power electronics subsystem 204 may be provided to some auxiliary units, for example, fans (not shown), heat exchangers 218-222, and the like, of the power generation system 200.

In some embodiments, the power electronics subsystem 204 may include a power processing unit 228, which in turn includes at least one power module 230 and a thermally conductive medium 232 disposed in thermal contact with the at least one power module 230. The power module 230 may include one or more switches, for example, semiconductor switches. Non-limiting examples of the semiconductor switches employed in the power module 230 may include transistors, gate commutated thyristors, field effect transistors (FET), insulated gate bipolar transistors (IGBT), gate turn-off thyristors (GTO), static induction transistors, static induction thyristors, or combinations thereof. Moreover, materials used to form the semiconductor switches may include, but are not limited to, silicon (Si), silicon carbide (SiC), gallium nitride (GaN), or combinations thereof. In some embodiments, when the power electronics subsystem 204 is implemented as the inverter (see FIG. 4), the semiconductor switches of the power module 230 may be arranged to form a DC-AC power converter (see FIG. 5).

In certain embodiments, the power processing unit 228 may include one or more power modules 230 based on a requirement of switches for a given configuration of the power processing unit 228. Accordingly, a desired number of power modules 230 having a determined number of corresponding switches may be used in the in the power processing unit 228. For ease of illustration, the power processing unit 228 of FIG. 2 is shown as including a single power module 230. In some embodiments, the power processing unit 228 may also include two (see FIG. 6) or more power modules 230.

The thermally conductive medium 232 may be a plate or a sheet of a thermally conductive material. Non-limiting examples of the thermally conductive materials used to form the thermally conductive medium 232 may include copper, a copper alloy, aluminium, an aluminium alloy, diamond, a diamond powder, composite materials such as copper-tungsten pseudo-alloy, silicon carbide in aluminium matrix (AlSiC), diamond in copper-silver alloy matrix (Dymalloy), and beryllium oxide in beryllium matrix (E-Material), or combinations thereof. In some embodiments, where the power processing unit 228 includes two or more power modules 230, the power processing unit 228 may include a thermally conductive medium 232 corresponding to each of the two or more power modules 230. In some other embodiments, where the power processing unit 228 includes two or more power modules 230, the power processing unit 228 may include a single common thermally conductive medium 232, where each of the power modules 230 may be disposed in thermal contact with the single common thermally conductive medium 232.

Moreover, in some embodiments, the power processing unit 228 may also include one or both of a first cooling channel 234 and a second cooling channel 236. The first cooling channel 234 and/or the second cooling channel 236 may represent conduits for allowing passage of the portion 203 of the fuel stream 201 and the water stream 238, respectively, through the power electronics subsystem 204. The first cooling channel 234 is fluidly coupled to the first conduit 206 to receive the portion 203 of the fuel stream 201 from the first conduit 206. The first cooling channel 234 is also fluidly coupled to second conduit 208 to supply the pre-heated fuel stream 205 to the second heat exchanger 220. The pre-heated fuel stream 205 is formed by heat transfer to the portion 203 of the fuel stream from the thermally conductive medium 232 via the first cooling channel 234. Moreover, the second cooling channel 236 is fluidly coupled to the third conduit 210 to receive the water stream 238 from the third conduit 210. The second cooling channel 236 is also fluidly coupled to fourth conduit 212 to supply the pre-heated water stream 240 to the third heat exchanger 222. The pre-heated water stream 240 is formed by heat transfer to the portion of the water stream 238 from the thermally conductive medium 232 via the second cooling channel 236.

In some other embodiments, the first cooling channel 234 and/or the second cooling channel 236 are formed integral to the thermally conductive medium 232 (see FIG. 3). Also, in certain embodiments, the first cooling channel 234 and/or the second cooling channel 236 are disposed in contact with the thermally conductive medium 232. The first cooling channel 234 and/or the second cooling channel 236 may be formed of the thermally conductive material. Non-limiting examples of the thermally conductive materials used to form the first cooling channel 234 and/or the second cooling channel 236 may include copper, a copper alloy, aluminium, an aluminium alloy, diamond, a diamond powder, composite materials such as copper-tungsten pseudo-alloy, silicon carbide in aluminium matrix (AlSiC), diamond in copper-silver alloy matrix (Dymalloy), and beryllium oxide in beryllium matrix (E-Material), or combinations thereof.

Referring now to FIG. 3, a perspective view 300 of a portion of the thermally conductive medium 232, in accordance with one embodiment of the present specification, is presented. The thermally conductive medium 232 may include one or more cooling channels such as a cooling channel 302 formed integral to the thermally conductive medium 232. For ease of illustration, only one cooling channel 302 is depicted in FIG. 3. In one embodiment, the cooling channel 302 may represent the first cooling channel 234 of FIG. 2. In another embodiment, the cooling channel 302 may represent the second cooling channel 236 of FIG. 2. In some embodiments, the cooling channel 302 may also include a plurality of fins 304 protruding radially inwardly into a cavity 306 of the cooling channel 302. Such fins 304 provide increased surface contact between an internal surface of the first cooling channel 234 and the portion 203 of the fuel stream in one embodiment or the water stream 238 in another embodiment passing therethrough. In some embodiments, a size of the thermally conductive medium 232 may be selected based on a size and a number of the power modules 230, and a size of the fins 304.

With returning reference to FIG. 2, during operation of the power generation system 200, a flow of the portion 203 of the fuel stream or both the portion 203 of the fuel stream and the water stream 238 via the power electronics subsystem 204 may be controlled depending on various parameters including, but not limited to, an operating state of the fuel-cell subsystem 202, a load on the power generation system 200, a temperature of the thermally conductive medium 232, a flow rate of the portion 203 of the fuel stream through the first cooling channel 234, a pressure of the portion 203 of the fuel stream in the first cooling channel 234, or combinations thereof. In some embodiments, only the portion 203 of the fuel stream 201 may be passed through the power electronics subsystem 204. In other embodiments, both the portion 203 of the fuel stream and the water stream 238 may be passed through the power electronics subsystem 204. Additional details of controlling the flow of the portion 203 of the fuel stream or both the portion 203 of the fuel stream and the water stream 238 will be described with reference to FIGS. 6 and 7.

Further, during operation of the power generation system 200, while processing the electrical power received from the fuel-cell subsystem 202, the power electronics subsystem 204 may generate heat. In accordance with some embodiments, the heat generated by the power electronics subsystem 204 is transferred to the portion 203 of the fuel stream or both the portion 203 of the fuel stream and the water stream 238 passing though the power electronics subsystem 204 thereby heating the portion 203 of the fuel stream or both the portion 203 of the fuel stream and the water stream 238 to respectively generate the pre-heated fuel stream 205 and the pre-heated water stream 240. In some embodiments, the pre-heated fuel stream 205 is supplied to the fuel-cell subsystem 202 via the second conduit 208. Also, in certain other embodiments, the pre-heated fuel stream 205 and the pre-heated water stream 240 are supplied to the fuel-cell subsystem 202 respectively via the second conduit 208 and the fourth conduit 212.

Table-2 represents non-limiting example of an amount heat removal in a one-megawatt (MW) power generation system using a fuel such as a natural gas (NG) supplied via the first conduit 206 and water supplied via the third conduit 210. The NG and water are supplied at various flow rates and temperatures as listed in Table-2.

TABLE 2

Heat removal example using both the NG and water

| Parameters | Unit | Case 1 | Case 2 | Case 3 | Case 4 | Case 5 | Case 6 |
|---|---|---|---|---|---|---|---|
| Load | % | 60% | 60% | 40% | 40% | 20% | 20% |
| $Cp_{NG}$ | kJ/kg/C. | 2.2 | 2.2 | 2.2 | 2.2 | 2.2 | 2.2 |
| NG mass flow rate ($m_{NG}$) | kg/second | 0.022 | 0.022 | 0.014 | 0.014 | 0.007 | 0.007 |
| $T_{in-NG}$ | ° C. | 0 | 30 | 0 | 30 | 0 | 30 |
| $T_{out-NG}$ | ° C. | 70 | 70 | 70 | 70 | 70 | 70 |
| Water mass flow rate ($m_W$) | kg/second | 0.065 | 0.065 | 0.043 | 0.043 | 0.022 | 0.022 |
| $T_{in-W}$ | ° C. | 0 | 30 | 0 | 30 | 0 | 30 |
| $T_{out-W}$ | ° C. | 70 | 70 | 70 | 70 | 70 | 70 |
| $Cp_W$ | kJ/kg/C. | 4.184 | 4.184 | 4.184 | 4.184 | 4.184 | 4.184 |

TABLE 2-continued

Heat removal example using both the NG and water

| Parameters | Unit | Case 1 | Case 2 | Case 3 | Case 4 | Case 5 | Case 6 |
|---|---|---|---|---|---|---|---|
| Heat removal by NG ($Q_{NG}$) | kW | 3.3 | 1.9 | 2.2 | 1.3 | 1.1 | 0.6 |
| Heat removal by water ($Q_W$) | kW | 19.0 | 10.8 | 12.7 | 7.2 | 6.3 | 3.6 |
| Total heat removal ($Q_{NG} + Q_W$) | kW | 22.3 | 12.7 | 14.9 | 8.5 | 7.4 | 4.2 |

In Table-2, $T_{in\text{-}W}$ represents the temperature of the water stream 238 prior to reaching the power electronics subsystem 204 (e.g., in the first conduit 206), and $T_{out\text{-}W}$ represents the temperature of the the pre-heated water stream 240, and $Cp_W$ represents heat capacity of the water. In some embodiments, the heat removal value ($Q_W$) may be determined using following equation:

$$Q_W = m_W * Cp_W * (T_{out\text{-}W} - T_{in\text{-}W}) \quad \text{(Equation 2)}$$

In a non-limiting example of case 1 where the power generation system 200 is operated at 60% load (i.e., part load) and if $T_{in\text{-}NG} = T_{in\text{-}W} = 0°$ C., $T_{out\text{-}NG} = T_{out\text{-}W} = 70°$ C., $m_{NG} = 0.022$, and, $m_W = 0.065$ kilogram/second, 19 kW of heat may be recovered by the water due to the heat transferred by the power electronics subsystem 204 to the water stream 238 flowing therethrough. Since, 3.3 kW of heat is also recovered due to use of the NG, a total 22.3 kW of heat may be recovered using both the NG and water.

Advantageously, in accordance with some embodiments, the configuration of the power generation system 200 utilizes the heat generated by the power electronics subsystem 204, which otherwise would have been dissipated in the surroundings of the power electronics subsystem 204, to pre-heat the portion 203 of the fuel stream or both the water stream 238 and the portion 203 of the fuel stream. This pre-heating of the portion 203 of the fuel stream, or in some embodiments, additionally the pre-heating of the water stream 238 prior to being supplied to the fuel-cell subsystem 202, reduces the heating requirement of the pre-heated fuel stream 205 or both the pre-heated fuel stream 205 and the pre-heated water stream 240 within the fuel-cell subsystem 202. Accordingly, a size, cost, and complexity of the fuel-cell subsystem 202 may be reduced in comparison to traditional fuel-cell subsystems. Moreover, the transfer of the heat from the power electronics subsystem 204 to the portion 203 of the fuel stream or both the portion 203 of the fuel stream and the water stream 238 passing though the power electronics subsystem 204 aids in cooling the power electronics subsystem 204. This cooling of the power electronics subsystem 204 effected by the transfer of the heat to the portion 203 of the fuel stream or both the portion 203 of the fuel stream and the water stream 238 obviates or minimizes need for additional cooling subsystems, thereby reducing the overall size, cost, and complexity of the power generation system 200 in comparison to the traditional power generation systems.

Referring now to FIG. 4, a block diagram of an inverter 400 for use in the power generation systems 100, 200 of FIGS. 1 and 2 as the respective power electronics subsystem 104, 204, in accordance with one embodiment of the present specification, is presented. In the embodiment of inverter 400 of FIG. 4, the inverter 400 is shown as including certain components such as the power processing unit 402, the thermally conductive medium 404, the first cooling channel 406 and/or the second cooling channel 408 that are similar to corresponding elements of FIG. 2.

Additionally, the inverter 400 includes a DC-AC power converter 410. In some embodiments, one or more switches of the one or more power modules 230 may be arranged to form the DC-AC power converter 410 (see FIG. 5). Accordingly, the DC-AC power converter 410 may represent an electronic circuit formed by arranging the one or more semiconductors switches of the one or more power modules 230. The DC-AC power converter 410 may be electrically coupled to the fuel-cell subsystem 102, 202 to receive the DC electrical power and convert the DC electrical power to the AC electrical power. The DC-AC power converter 410 will be described in greater detail in conjunction with FIG. 5.

Figure 5:
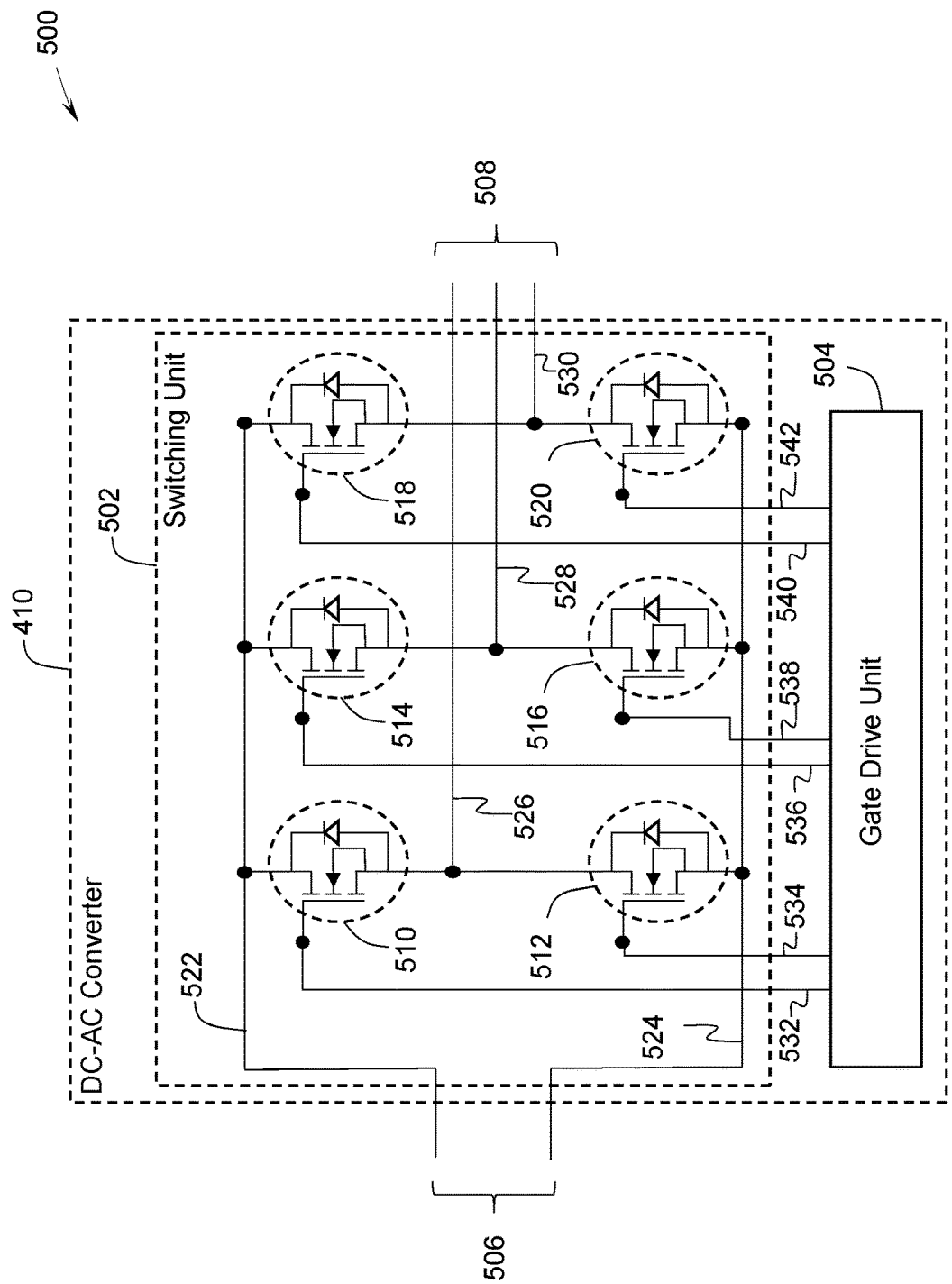
FIG. 5 is a schematic diagram of a DC-AC power converter used in the inverter of FIG. 4, in accordance with one embodiment of the present specification.

Turning now to FIG. 5, a schematic diagram 500 of the DC-AC power converter 410 used in the inverter 400 of FIG. 4, in accordance with one embodiment of the present specification, 4 is presented. As previously noted, the DC-AC power converter 410 is configured to convert the DC electrical power to the AC electrical power. In a non-limiting example of FIG. 5, the DC-AC power converter 410 represents a three-phase DC-AC power converter. Use of a single phase or multi-phase DC-AC power converter is also envisioned within the scope of the present specification.

In some embodiments, the DC-AC power converter 410 may include a switching unit 502, a gate drive unit 504, an input port 506, and an output port 508. The input port 506 of the DC-AC power converter 410 may be connected to the fuel-cell subsystem 202 of FIG. 2 to receive the DC electrical power generated by the fuel-cell subsystem 202. The output port 508 of the DC-AC power converter 410 may be connected to the output power port 225 of the power generation system 200 of FIG. 5 to supply the AC electrical power thereto.

Further, in certain embodiments, the switching unit 502 of the DC-AC power converter 410 may include an arrangement of one or more semiconductor switches corresponding to one or more power modules 230. The switching unit 502 may be implemented using the one or more power modules 230 of FIG. 2. In a non-limiting example, the switching unit 502 may include semiconductor switches 510, 512, 514, 516, 518, and 520 that are arranged as shown in FIG. 5. The semiconductor switches 510, 512, 514, 516, 518, and 520 are hereinafter collectively referred to as semiconductor switches 510-520. Non-limiting examples of the semiconductor switches 510-520 may include transistors, gate commutated thyristors, field effect transistors, insulated gate bipolar transistors, gate turn-off thyristors, static induction transistors, static induction thyristors, or combinations thereof. Moreover, materials used to form the semiconductor switches 510-520 may include, but are not limited to, silicon (Si), silicon carbide (SiC), gallium nitride (GaN), or combinations thereof. Although the switching unit 502 is shown as including six (6) semiconductor switches 510-520, use of a switching unit employing fewer or greater than six semiconductor switches is also envisioned. The DC-AC power converter 410 may be implemented using one or more power modules 230. In particular, a number of power modules 230 that are required to implement the DC-AC power converter 410 may be determined based on a required number of switches to form the DC-AC power converter 410 and a number of switches corresponding to each of the power module 230. For example, if the power module 230 includes 6 semiconductor switches, the DC-AC power converter 410 may be implemented using a single power module 230. However, if the power module 230 includes only two (2) semiconductor switches, three power modules 230 may be needed to implement the DC-AC power converter 410.

Furthermore, in the non-limiting example of FIG. 5, the semiconductor switches 510-520 are shown as N-channel field effect transistors (FETs). These FETs 510-520 may include a drain terminal, a source terminal, and a control terminal (e.g., a gate terminal). As depicted in FIG. 5, the drain terminals of the semiconductor switches 510, 514, and 518 are coupled to a DC conductor 522 and the source terminals of the semiconductor switches 512, 516, and 520 are coupled to a DC conductor 524. The DC conductor 522 may be maintained at a positive potential while the DC conductor 524 may be maintained at a negative potential. Further, the source terminals of the semiconductor switches 510, 514, and 518 may be respectively coupled to the drain terminals of the semiconductor switches 512, 516, and 520. Also, the source terminals of the semiconductor switches 510, 514, and 518 and the drain terminals of the semiconductor switches 512, 516, and 520 may be coupled to output phase lines 526, 528, and 530. Additionally, the control terminals of the semiconductor switches 510-520 are coupled to the gate drive unit 504 to receive respective control signals. More particularly, the control terminals of the semiconductor switches 510, 512, 514, 516, 518, and 520 are respectively coupled to the output terminals 532, 534, 536, 538, 540, and 542 of the gate drive unit 504.

The gate drive unit 504 is used to control switching of the semiconductor switches 510-520 by selectively supplying control signals to the control terminals of the semiconductor switches 510-520. The gate drive unit 504 may include electronics (hardware and/or software) capable of generating a plurality of control signals. In a non-limiting example, the gate drive unit 504 may include logic gates, transistors, a microcontroller, a microprocessor, memory, or combinations thereof.

Figure 6:
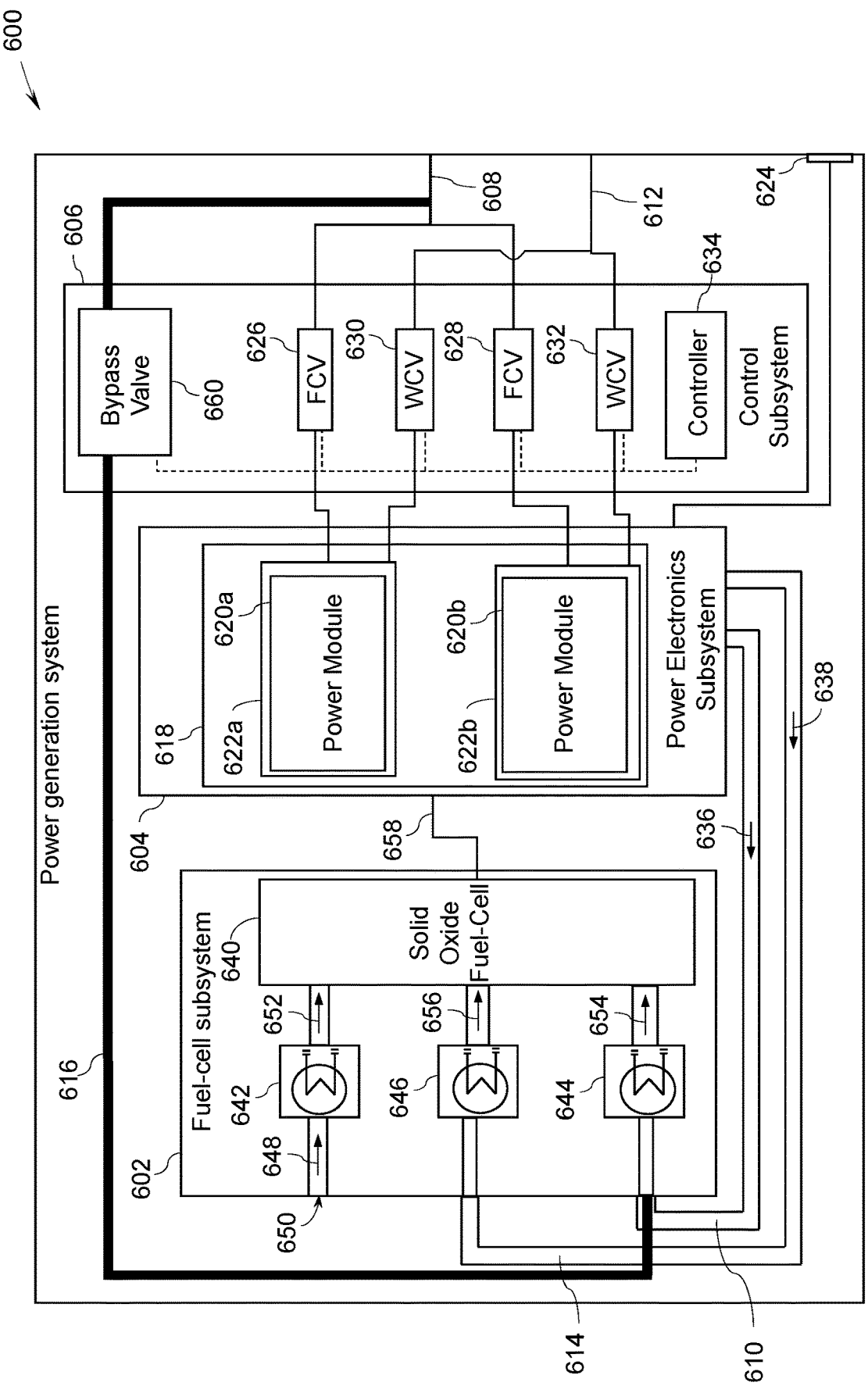
FIG. 6 is a block diagram of a power generation system, in accordance with yet another embodiment of the present specification.

FIG. 6 is a block diagram of another embodiment of a power generation system 600, in accordance with yet another embodiment the present specification. In some embodiments, the power generation system 600 may include one or more of the fuel-cell subsystem 602, a power electronics subsystem 604, a control subsystem 606, the first conduit 608, the second conduit 610, the third conduit 612, and the fourth conduit 614. In some embodiments, the power generation system 600 may also include a bypass conduit 616. The power generation system 600 may be coupled to a fuel source (not shown) similar to the fuel source 214 and a water source (not shown) similar to the water source 216 of FIG. 2. The fuel-cell subsystem 602, a power electronics subsystem 604, the first conduit 608, the second conduit 610, the third conduit 612, and the fourth conduit 614 may be respectively representative of one embodiment of fuel-cell subsystem 202, a power electronics subsystem 204, the first conduit 206, the second conduit 208, the third conduit 210, and the fourth conduit 212 of FIG. 2.

In the embodiment of FIG. 6, the power electronics subsystem 604 includes a power processing unit 618. The power processing unit 618 includes two power modules 620a and 620b and corresponding thermally conductive mediums 622a, 622b. In some embodiments, the power processing unit 618 may include a common thermally conductive medium for both power modules 620a and 620b. The power modules 620a, 620b may be similar to the power module 230 of FIG. 2. The thermally conductive mediums 622a, 622b may be similar to the thermally conductive medium 232 of FIG. 2. Moreover, in some embodiments, the power electronics subsystem 604 may be electrically coupled to an output power port 624 of the power generation system 600 to supply an AC electrical power thereto.

The control subsystem 606 is fluidly coupled to the power electronics subsystem 604. The control subsystem 606 is configured to control flow of a portion (not shown in FIG. 6) of a fuel stream and a water stream (not shown in FIG. 6) to the power electronics subsystem 604. The control subsystem 606 may include at least one fuel control valve (FCV), such as FCVs 626, 628 fluidly coupled to a first cooling channel (not shown in FIG. 6). For example, the FCV 626 may be fluidly coupled between the first conduit 608 and the first cooling channel corresponding to the power module 620a. The FCV 628 may be fluidly coupled between the first conduit 608 and the first cooling channel corresponding to the power module 620b.

The control subsystem 606 may also include at least one water control valve (WCV), such as WCVs 630, 632 fluidly coupled to a second cooling channel (not shown in FIG. 6). For example, the WCV 630 may be fluidly coupled between the third conduit 612 and the second cooling channel corresponding to the power module 620a. The WCV 632 may be fluidly coupled between the third conduit 612 and the second cooling channel corresponding to the power module 620b. The FCVs 626, 628 and the WCVs 630, 632 may be typical ON/OFF valves. The FCVs 626, 628 and the WCVs 630, 632 may be electronically controllable. To minimize the complexity of the representation of the power generation system 600 in FIG. 6, the first cooling channel and the second cooling channel are not depicted.

Moreover, the control subsystem 606 may also include a controller 634 operatively coupled to the FCVs 626, 628 and the WCVs 630, 632 to selectively control supply of a pre-heated fuel stream 636 and a pre-heated water stream 638 to the fuel-cell subsystem 602. In some embodiments, The controller 634 may selectively control one or more of the FCVs 626, 628 and the WCVs 630, 632 to control supply of the pre-heated fuel stream 636 and the pre-heated water stream 638 to the fuel-cell subsystem 602 based on an operating state of the fuel-cell subsystem 602, a load on the power generation system 600, a temperature of the thermally conductive mediums 622a, 622b (or the single common thermally conductive medium), a flow rate of the portion of the fuel stream through the first cooling channel, a pressure of the portion of the fuel stream in the first cooling channel, or combinations thereof.

The controller 634 may include a specially programmed general-purpose computer, an electronic processor such as a microprocessor, a digital signal processor, and/or a microcontroller. Further, the controller 634 may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the controller 634 may be implemented as hardware elements such as circuit boards with processors or as software running on a processor such as a personal computer (PC), or a microcontroller.

Moreover, the fuel-cell subsystem 602 may include an SOFC 640, a first heat exchanger 642, a second heat exchanger 644, and a third heat exchanger 646 that are respectively similar to the SOFC 224, the first heat exchanger 218, the second heat exchanger 220, and a third heat exchanger 222 of the fuel-cell subsystem 202 of FIG. 2. The first heat exchanger 642, the second heat exchanger 644, and the third heat exchanger 646 respectively receive a heat transfer fluid 648, a pre-heated fuel stream 636, and a pre-heated water stream 638. The heat transfer fluid 648 may be received by the first heat exchanger 642 via an inlet 650. Moreover, the first heat exchanger 642, the second heat exchanger 644, and the third heat exchanger 646 respectively supply a heated heat transfer fluid 652, a heated fuel stream 654, and steam 656 to the SOFC 640. The SOFC 640 may in-turn generate an electrical power using the heated heat transfer fluid 652, the heated fuel stream 654, and the steam 656. The fuel-cell subsystem 602 is electrically coupled to the power electronics subsystem 604 via an electrical link 658. The electrical link 658 may be similar to the electrical link 223 of FIG. 2. The electrical power generated by the SOFC 640 may be supplied to the power electronics subsystem 604 via the electrical link 658.

In certain instances, the fuel stream supplied via the power electronics subsystem 604 to the fuel-cell subsystem 602 may be insufficient to achieve a given load demand of the power generation system 600. Therefore, to meet this given load demand, an additional supply of fuel to the fuel-cell subsystem 602 is desired. To that end, the control subsystem 606 may be fluidly coupled to the fuel-cell subsystem 602. In particular, the control subsystem 606 may include a bypass valve 660 fluidly coupled between the first conduit 608 and the fuel-cell subsystem 602. The bypass valve 660 may be disposed along the bypass conduit 616, as shown in FIG. 6. The bypass valve 660 may also be operatively coupled to the controller 634. The controller 634 may be configured to selectively control the bypass valve 660 to supply an additional fuel to the fuel-cell subsystem 602. By way of example, when the flow rate of the portion of the fuel stream supplied via the power electronics subsystem 604 is insufficient to achieve a given load demand of the power generation system 600, the additional fuel may be supplied to the fuel-cell subsystem 602 via the bypass valve 660. To facilitate the supply of the fuel via the bypass valve 660, the controller 634 may be configured to operate the bypass valve 660 in an ON condition. In the ON condition, the bypass valve 660 allows flow of the fuel therethrough.

Figure 7:
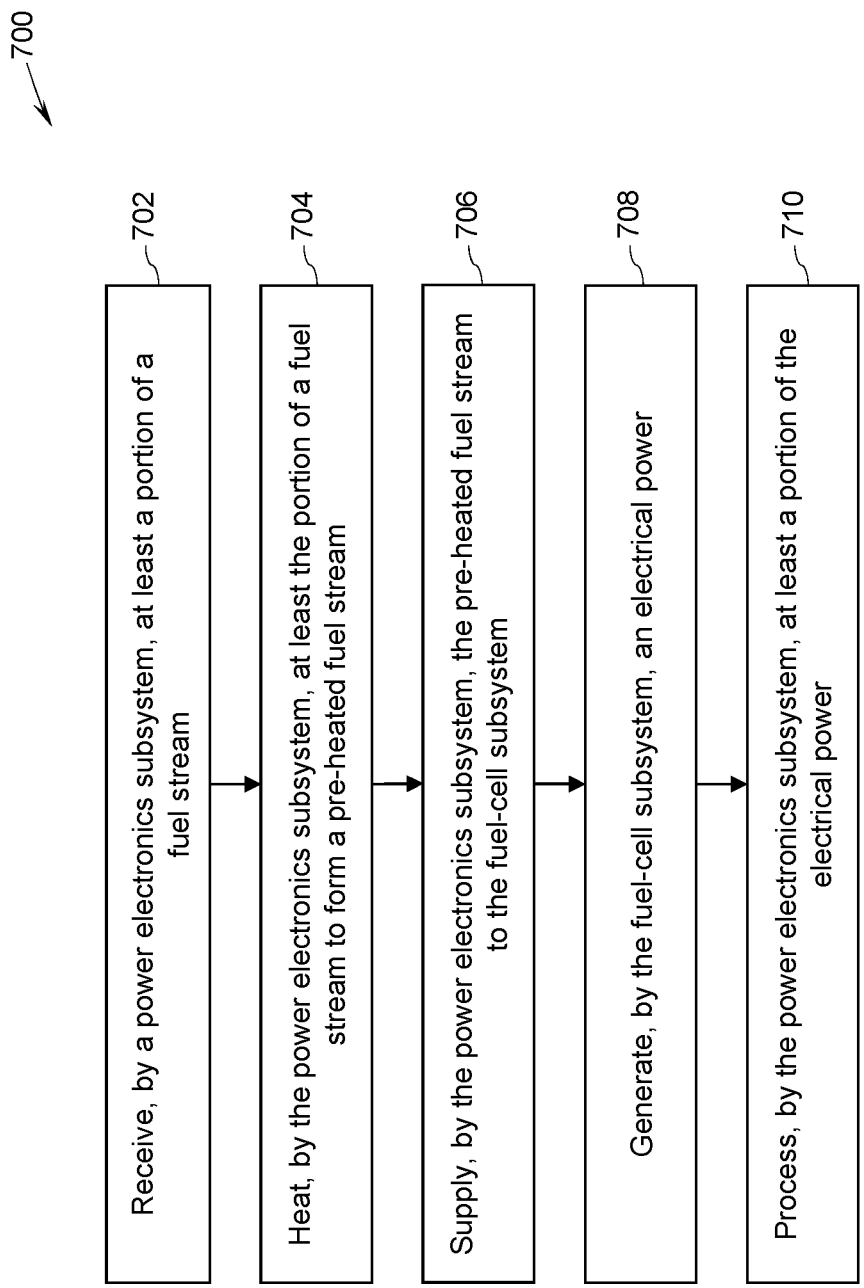
FIG. 7 is a flow diagram of a method for operating a power generation system, in accordance with one embodiment of the present specification.

FIG. 7 is a flow diagram 700 of a method for operating a power generation system, in accordance with one embodiment of the present specification. Although, the flow diagram 700 is described with reference to FIG. 1 for ease of illustration, the steps of flow diagram 700 may also be applicable to the power generation systems 200 and 600 of FIG. 2 and FIG. 6, respectively.

At step 702, at least a portion 120 of a fuel stream may be received by the power electronics subsystem 104. The portion 120 of the fuel stream may be received by the power electronics subsystem 104 via the first conduit 106. Further, at step 704, at least the portion of the fuel stream may be heated by the power electronics subsystem 104 to form a pre-heated fuel stream. As previously noted, during operation of the power generation system 100, internal components of the power electronics subsystem 104 may generate heat. This heat generated by the power electronics subsystem 104 may be transferred to the portion 120 of the fuel stream passing through the power electronics subsystem 104. Accordingly, the portion 120 of the fuel stream passing through the power electronics subsystem 104 is heated, thereby generating the pre-heated fuel stream 122.

Moreover, at step 706, the pre-heated fuel stream 122 may be supplied to the fuel-cell subsystem 102 by the power electronics subsystem 104. The pre-heated fuel stream 122 may be supplied to the fuel-cell subsystem 102 from the power electronics subsystem 104 via the second conduit 108. Furthermore, at step 708, the fuel-cell subsystem 102 may generate an electrical power using the pre-heated fuel stream 122 supplied from the power electronics subsystem 104, as described with respect to FIGS. 1 and 2. For example, the fuel-cell 110 of the fuel-cell subsystem 102 may generate a DC electrical power. The electrical power generated by the fuel-cell subsystem 102 may be supplied to the power electronics subsystem 104 via the electrical link 112.

Additionally, at step 710, at least a portion of the electrical power may be processed by the power electronics subsystem 104. In some embodiments, the processing of the electrical power by the power electronics subsystem 104 may include converting the DC electrical power in the AC electrical power. In some embodiments, the processing of the electrical power by the power electronics subsystem 104 may include increasing or decreasing a magnitude of the electrical power received from the fuel-cell subsystem 102. In some embodiments, the power electronics subsystem 104 may supply electrical power, hereinafter referred to as a processed electrical power, to the output power port 114 of the power generation system 100. Accordingly, the processed electrical power may be available for use by any external load connected to the output power port 114. In certain embodiments, the processed electrical power may be available for use by the auxiliary units of the power generation system 100.

Figure 8:
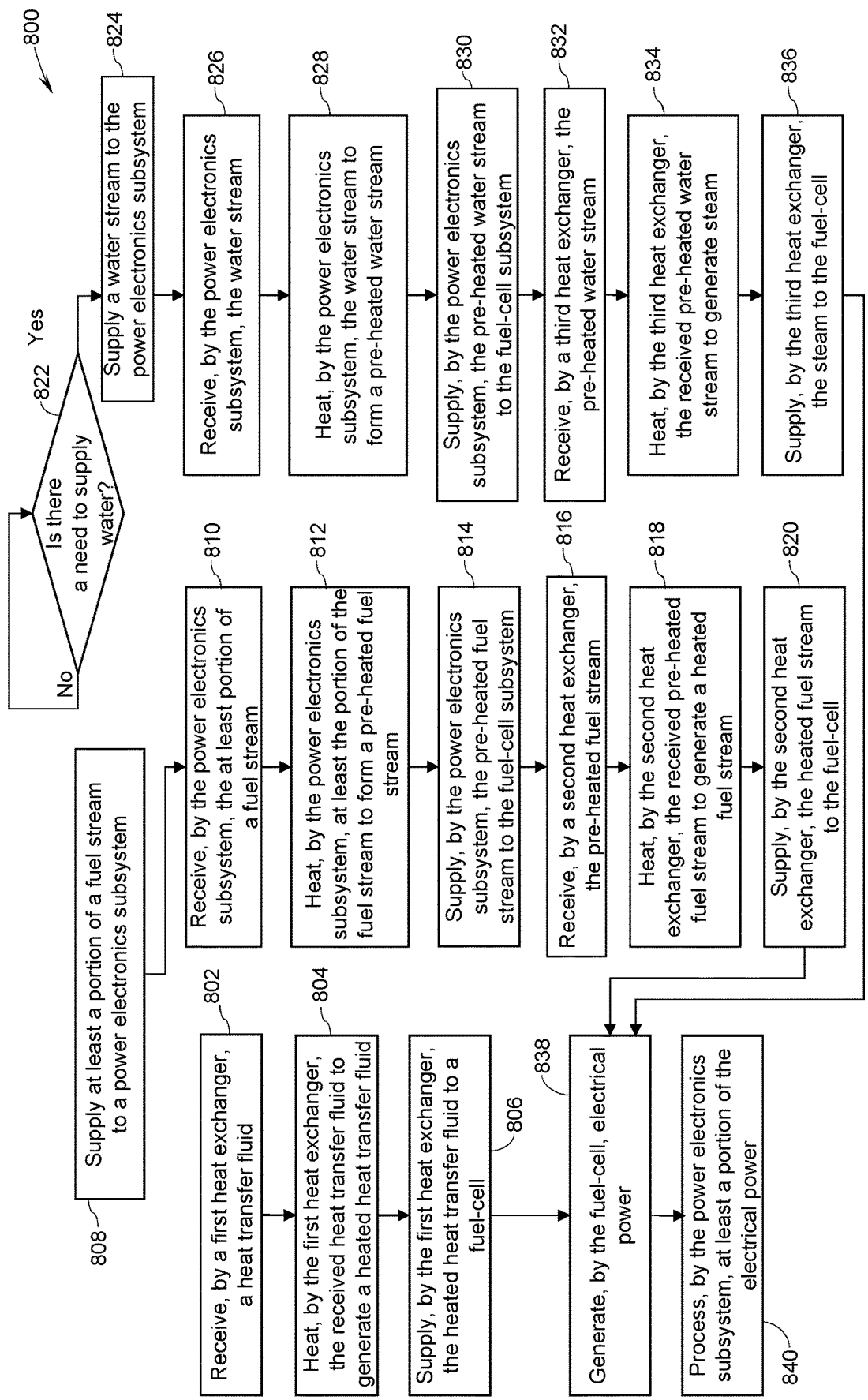
FIG. 8 is a flow diagram of another method for operating a power generation system, in accordance with one embodiment of the present specification.

FIG. 8 is a detailed flow diagram 800 of another method for operating a power generation system, in accordance with another embodiment of the present specification. Although, the flow diagram 800 is described with reference to FIGS. 2 and 6 for ease of illustration, the steps of flow diagram 800 may also be applicable to the power generation system 100 of FIG. 1.

At step 802, a heat transfer fluid 242, 648 may be received by the first heat exchanger 218, 642. For example, the heat transfer fluid 242, 648, such as ambient air may be received by the first heat exchanger 218, 642 via the inlet 226, 650. Further, at step 804, the received heat transfer fluid 242, 648 may be heated by the first heat exchanger 218, 642 to generate a heated heat transfer fluid 244, 652. Moreover, at step 806, the heated heat transfer fluid 244, 652 may be supplied to the fuel-cell such as the SOFC 224, 640 by the first heat exchanger 218, 642.

Moreover, at step 808, a portion 203 of the fuel stream may be supplied to the power electronics subsystem 204, 604. In some embodiments, a flow of the portion 203 of the fuel stream may be controlled by the controller 634 via the FCVs 626, 628. To supply the portion 203 of the fuel stream to the power electronics subsystem 204, 604, the controller 634 may be configured to operate the FCVs 626, 628 in an ON condition so that the portion 203 of the fuel stream is passed through the FCVs 626, 628. Subsequently, at step 810, the portion 203 of the fuel stream may be received by the power electronics subsystem 204, 604 via the first conduit 206, 608. Further, at least the portion 203 of the fuel stream may be heated by the power electronics subsystem 204, 604 to form a pre-heated fuel stream 205, 636, as indicated by step 812. Also, at step 814, the pre-heated fuel stream 205, 636 may be supplied to the fuel-cell subsystem 202, 602 by the power electronics subsystem 204, 604 via the second conduit 208, 610. It may be noted that steps 810, 812, and 814 are similar to steps 702, 704, and 706, respectively, of FIG. 7.

Further, at step 816, the pre-heated fuel stream 205, 636 may be received by the second heat exchanger 220, 644. The pre-heated fuel stream 205, 636 may be received by the second heat exchanger 220, 644 from the power electronics subsystem 204, 604 via the second conduit 208, 610. At step 818, the received pre-heated fuel stream 205, 636 may be heated by the second heat exchanger 220, 644 to generate a heated fuel stream 246, 654. Moreover, at step 820, the heated fuel stream 246, 654 may be supplied to a fuel-cell such as the SOFC 224, 640 from the second heat exchanger 220, 644.

In some embodiments, while one or more of the steps 802-820 are being performed, at step 822, a check may be performed to determine whether there exists a need to supply water to the fuel-cell subsystem 202, 602. By way of example, the controller 634 may perform the check at step 822 based on various parameters including, but not limited to, an operating state of the fuel-cell subsystem 202, 602, a load on the power generation system 200, 600, a temperature of the thermally conductive medium 232, 622a, 622b, a flow rate of the portion 203 of the fuel stream in the first cooling channel 234, a pressure of the portion 203 of the fuel stream in the first cooling channel 234, or combinations thereof.

The operating state of the fuel-cell subsystem 202, 602 may include a start-up state and a nominal operating state. Typically, the start-up state may be representative of a state of the fuel-cell subsystem 202, 602 when the fuel-cell subsystem 202, 602 warms-up and no electrical power is generated by the fuel-cell subsystem 202, 602. The nominal operating state may be representative of a state of the fuel-cell subsystem 202, 602 when the fuel-cell subsystem 202, 602 generates electrical power. In some embodiments, if it is determined that the fuel-cell subsystem 202, 602 is operating in the start-up state, the controller 634, at step 822, may determine that there exists a need to supply water to the fuel-cell subsystem 202, 602 during the start-up state the fuel-cell subsystem 202, 602.

In some embodiments, the load on the power generation system 200, 600 may also be utilized by the controller 634 to determine whether there exists a need to supply water to the fuel-cell subsystem 202, 602. For example, if the power generation system 200, 600 operates in a part load condition, the controller 634, at step 822, may determine that there exists a need to supply water to the fuel-cell subsystem 202, 602 to maintain a predefined steam to carbon ratio. The part load condition may be defined as an operation of the power generation system 200, 600 at a load value lower than a predefined threshold load. In a non-limiting example, the predefined threshold load may be a value in a range from about 1% to about 60% of a rated load of the power generation system 200, 600. By way of example, the predefined threshold load may be about 60% of the rated load of the power generation system 200, 600.

In some embodiments, if the temperature of the thermally conductive medium 232, 622a, 622b is more than a predefined threshold temperature, the controller 634, at step 822, may determine that there exists a need to supply water to the fuel-cell subsystem 202, 602. In some other embodiments, if the flow rate of the portion 203 of the fuel stream in the first cooling channel 234 has reached a maximum flow rate and a desired cooling of the power electronics subsystem 204, 604 is not achieved, the controller 634, at step 822, may determine that there exists a need to supply water to the fuel-cell subsystem 202, 602. In certain embodiments, if the pressure of the portion 203 of the fuel stream in the first cooling channel 234 is less than a predefined threshold pressure, the controller 634, at step 822, may determine that there exists a need to supply water to the fuel-cell subsystem 202, 602. The values of the predefined threshold load, the predefined threshold temperature, the maximum flow rate, and the predefined threshold pressure may be stored/preconfigured in the controller 634. In certain embodiments, the values of the predefined threshold load, the predefined threshold temperature, the maximum flow rate, and the predefined threshold pressure may be customizable.

At step 822, if it is determined that the supply of the water is not needed, the controller 634 may continue to repeatedly perform the check at step 822. However, at step 822, if it is determined that the supply of the water is needed, at step 824, a water stream 238 may be supplied to the power electronics subsystem 204, 604. The water stream 238 may be supplied to the power electronics subsystem 204, 604 via the third conduit 210, 612. In some embodiments, a flow of the water stream 238 may be controlled by the controller 634 via the WCVs 630, 632. To supply the water stream 238 to the power electronics subsystem 204, 604, the controller 634 may be configured to operate the WCVs 630, 632 in an ON condition so that the water stream 238 is passed through the WCVs 630, 632.

Moreover, at step 826, the water stream 238 may be received by the power electronics subsystem 204, 604. The water stream 238 may be received by the power electronics subsystem 204, 604 via the third conduit 210, 612. Further, at step 828, the water stream 238 may be heated by the power electronics subsystem 204, 604 to form a pre-heated water stream 240, 638. The pre-heated water stream 240, 638 may be formed due to the heat transferred to the water stream 238 passing through the power electronics subsystem 204, 604 via the second cooling channel 236. Moreover, at step 830, the pre-heated water stream 240, 638 may be supplied to the fuel-cell subsystem 202, 602 by the power electronics subsystem 204, 604. The pre-heated water stream 240, 638 may be supplied to the fuel-cell subsystem 202, 602 from the power electronics subsystem 204, 604 via the fourth conduit 212, 614.

Subsequently, at step 832, the pre-heated water stream 240, 638 may be received by the third heat exchanger 222, 646. The pre-heated water stream 240, 638 may be received by the third heat exchanger 222, 646 from the power electronics subsystem 204, 604 via the fourth conduit 212, 614. At step 834, the received pre-heated water stream 240, 638 may be heated by the third heat exchanger 222, 646 to generate steam 248, 656. Moreover, at step 836, the steam 248, 656 may be supplied to the fuel-cell such as the SOFC 224, 640 by the third heat exchanger 222, 646.

In some embodiments, a first set including steps 802-806, a second set including steps 808-820, and a third set including steps 822-836 may be performed in parallel with one another. In certain embodiments, method steps within each of the first, second, and third sets of the steps 802-806, 808-820, and 822-836 may be performed in series or parallel.

In some embodiments, at step 838, the electrical power may be generated by the fuel-cell such as the SOFC 224, 640 of the fuel-cell subsystem 202, 602. The electrical power, for example, the DC electrical power, may be generated by the fuel-cell such as the SOFC 224, 640 based on a chemical reaction between the heated heat transfer fluid 244, 652 (generated at step 806), the heated fuel stream 246, 654 (supplied at step 820), and the steam 248, 656 (supplied at step 836). Moreover, at step 840, at least a portion of the electrical power generated by the SOFC 224, 640 may be processed by the power electronics subsystem 204, 604. In some embodiments, the power electronics subsystem 204, 604 may supply the processed electrical power to the output power port 225, 624 of the power generation system 200, 600. Accordingly, the processed electrical power may be available for use by any external load connected to the output power port 225, 624. In certain embodiments, the processed electrical power may be available for use by auxiliary units of the power generation system 200, 600.

In accordance with some aspects of the present specification, configurations of the power generation system 100, 200, 600 exhibit certain advantages over traditional fuel-cell based power generation systems. In accordance with some embodiments, the power generation system 100, 200, 600 utilizes the heat generated by the respective power electronics subsystem 104, 204, 604, which otherwise, would have been dissipated in the surroundings of the power electronics subsystem 104, 204, 604 to pre-heat the portion 120, 203 of the fuel stream or both the portion 120, 203 of the fuel stream and the water stream 238. This pre-heating of the portion 120, 203 of the fuel stream and the water stream 238 prior to being supplied to the respective fuel-cell subsystem 102, 202, 602 aids in reducing the requirement for heating the pre-heated fuel stream 122, 205, 636 or both the pre-heated fuel stream 122, 205, 636 and the pre-heated water stream 240, 638 within the fuel-cell subsystem 102, 202, 602. Accordingly, the size, cost, and complexity of the fuel-cell subsystem 102, 202, 602 may be reduced in comparison to traditional fuel-cell subsystems.

Moreover, the transfer of the heat from the power electronics subsystem 104, 204, 604 to the portion 120, 203 of the fuel stream or both the portion 120, 203 of the fuel stream and the water stream 238 passing though the power electronics subsystem 104, 204, 604 aids in cooling the power electronics subsystem 104, 204, 604. This cooling of the power electronics subsystem 104, 204, 604 effected by the transfer of the heat to the portion 120, 203 of the fuel stream or both the portion 120, 203 of the fuel stream and the water stream 238 obviates or minimizes need for additional cooling subsystems thereby reducing overall size, cost, and complexity of the power generation system 100, 200, 600 in comparison to a traditional power generation system. Additionally, due to the heat recovered by the pre-heating of the portion 120, 203 of the fuel stream or both the portion 120, 203 of the fuel stream and the water stream 238, the efficiency of the power generation system 100, 200, 600 is also improved in comparison to the efficiency of the traditional power generation system.

This written description uses examples to disclose the invention, including the preferred embodiments, and also to enable any person skilled in the art to practice the invention, including making and using any devices or systems and performing any incorporated methods. The patentable scope of the present specification is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A power generation system, comprising:
   a fuel-cell subsystem comprising a solid oxide fuel-cell configured to generate an electrical power;
   a power electronics subsystem electrically coupled to the fuel-cell subsystem and configured to process at least a portion of the electrical power generated by the fuel-cell subsystem;
   a first conduit fluidly coupled to the power electronics subsystem and configured to supply at least a portion of a fuel stream to the power electronics subsystem, wherein the power electronics subsystem is configured to heat the portion of the fuel stream to form a pre-heated fuel stream; and
   a second conduit fluidly coupled to the power electronics subsystem and the fuel-cell subsystem and configured to supply the pre-heated fuel stream to the fuel-cell subsystem,
   wherein the solid oxide fuel-cell does not require a steam reformer and is configured to generate the electrical power using the pre-heated fuel stream,
   wherein the power electronics subsystem further comprises:
   a power processing unit comprising:
   a power module;
   a thermally conductive medium disposed in thermal contact with the power module;
   a first cooling channel disposed in thermal contact with the thermally conductive medium, wherein the first cooling channel is fluidly coupled to:
   the first conduit to receive the portion of the fuel stream, and
   the second conduit to supply the pre-heated fuel stream to a second heat exchanger, wherein the pre-heated fuel stream is formed by heat transfer to the portion of the fuel stream from the thermally conductive medium via the first cooling channel, and
   wherein the power processing unit further comprises a second cooling channel disposed in thermal contact with the thermally conductive medium, wherein the second cooling channel is fluidly coupled to the fuel-cell subsystem and configured to receive water, and supply a pre-heated water stream to the fuel-cell subsystem, and wherein the pre-heated water stream is formed by heat transfer to water from the thermally conductive medium via the second cooling channel.

2. The power generation system of claim 1, wherein the fuel stream comprises a hydrocarbon gas.

3. The power generation system of claim 1, wherein the fuel-cell subsystem further comprises a first heat exchanger configured to:
   receive a heat transfer fluid;
   heat the received heat transfer fluid to generate a heated heat transfer fluid; and supply the heated heat transfer fluid to the solid oxide fuel-cell.

4. The power generation system of claim 1, wherein the fuel-cell subsystem further comprises the second heat exchanger configured to:
   receive the pre-heated fuel stream;
   heat the received pre-heated fuel stream to generate a heated fuel stream; and supply the heated fuel stream to the solid oxide fuel-cell.

5. The power generation system of claim 1, wherein the power processing unit comprises at least one of a DC-AC power converter and an auxiliary power electronics circuit.

6. The power generation system of claim 1, wherein the fuel-cell subsystem further comprises a third heat exchanger configured to:
   receive the pre-heated water stream and heat the received pre-heated water stream to generate steam; and
   supply the steam to the solid oxide fuel-cell.

7. The power generation system of claim 1, further comprising a control subsystem fluidly coupled to the power electronics subsystem and the fuel-cell subsystem, wherein the control subsystem comprises:
   a fuel control valve fluidly coupled to the first cooling channel;
   a water control valve fluidly coupled to the second cooling channel; and
   a controller operatively coupled to the fuel control valve and the water control valve to selectively control supply of the pre-heated water stream and the pre-heated fuel stream to the fuel-cell subsystem.

8. The power generation system of claim 7, wherein the controller is configured to selectively control one or more of the fuel control valve and the water control valve based on an operating state of the fuel-cell subsystem, a load on the power generation system, a temperature of the thermally conductive medium, a flow rate of the portion of the fuel stream through the first cooling channel, a pressure of the fuel stream in the first cooling channel, or combinations thereof.

9. A method for operating the power generation system of claim 1, the method comprising:
   receiving, by the power electronics subsystem, at least a portion of the fuel stream;
   heating, by the power electronics subsystem, at least portion of the fuel stream to form a pre-heated fuel stream;
   supplying, by the power electronics subsystem, the pre-heated fuel stream to the fuel-cell subsystem,
   generating, by the solid oxide fuel-cell, the electrical power using the pre- heated fuel stream; and
   processing, by the power electronics subsystem, at least a portion of the electrical power generated by the fuel-cell subsystem.

10. The method of claim 9, further comprising:
    receiving, by a first heat exchanger disposed in the fuel-cell subsystem, a heat transfer fluid;
    heating, by the first heat exchanger, the heat transfer fluid to generate a heated heat transfer fluid; and
    supplying, by the first heat exchanger, the heated heat transfer fluid to the solid oxide fuel-cell.

11. The method of claim 9, further comprising:
    receiving, by a second heat exchanger disposed in the fuel-cell subsystem, the pre-heated fuel stream from the power electronics subsystem;
    heating, by the second heat exchanger, the pre-heated fuel stream to generate a heated fuel stream; and
    supplying, by the second heat exchanger, the heated fuel stream to the solid oxide fuel-cell.

12. The method of claim 9, further comprising:
    receiving, by a third heat exchanger disposed in the fuel-cell subsystem, a pre-heated water stream from the power electronics subsystem;
    heating, by the third heat exchanger, the pre-heated water stream to generate steam; and
    supplying, by the third heat exchanger, the steam to the solid oxide fuel-cell.

* * * * *